(12) United States Patent
Kim

(10) Patent No.: US 8,692,778 B2
(45) Date of Patent: Apr. 8, 2014

(54) METHOD AND APPARATUS FOR CONTROLLING DISPLAY AREA OF TOUCH SCREEN DEVICE

(75) Inventor: Ji-sang Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 703 days.

(21) Appl. No.: 12/243,289

(22) Filed: Oct. 1, 2008

(65) Prior Publication Data

US 2009/0184935 A1   Jul. 23, 2009

(30) Foreign Application Priority Data

Jan. 17, 2008   (KR) .......................... 10-2008-0005334

(51) Int. Cl.
  *G06F 3/041*   (2006.01)
  *G06F 3/0488*   (2013.01)
(52) U.S. Cl.
  CPC ............ *G06F 3/0416* (2013.01); *G06F 3/0488* (2013.01)
  USPC .......................................... 345/173; 345/178
(58) Field of Classification Search
  CPC ............................... G06F 3/0416; G06F 3/0488
  USPC ........... 345/23, 173–179, 949, 698; 715/808, 715/862–864; 713/300, 324; 463/39, 20, 463/32, 42, 16; 455/566
  See application file for complete search history.

(56) References Cited

U.S. PATENT DOCUMENTS

| | | | |
|---|---|---|---|
| 7,012,550 B2 * | 3/2006 | Iwakiri et al. ............. 340/932.2 |
| 7,406,666 B2 * | 7/2008 | Davis et al. .................... 715/863 |
| 7,653,883 B2 * | 1/2010 | Hotelling et al. ............. 715/863 |
| 7,890,778 B2 * | 2/2011 | Jobs et al. ...................... 713/300 |
| 8,217,904 B2 * | 7/2012 | Kim ............................... 345/173 |
| 2002/0021278 A1 * | 2/2002 | Hinckley et al. ............. 345/156 |
| 2003/0076343 A1 * | 4/2003 | Fishkin et al. ................ 345/701 |
| 2003/0100965 A1 * | 5/2003 | Sitrick et al. .................... 700/83 |
| 2004/0046791 A1 | 3/2004 | Davis et al. |
| 2004/0104894 A1 * | 6/2004 | Tsukada et al. ............... 345/168 |
| 2004/0150162 A1 * | 8/2004 | Okada ............................ 273/292 |
| 2004/0152502 A1 * | 8/2004 | Okada .............................. 463/16 |
| 2004/0249564 A1 * | 12/2004 | Iwakiri et al. ................. 701/200 |
| 2005/0012723 A1 * | 1/2005 | Pallakoff ........................ 345/173 |

(Continued)

FOREIGN PATENT DOCUMENTS

JP  2007-028512  2/2007
KR  2002-85309  11/2002

(Continued)

OTHER PUBLICATIONS

International Search Report and Written Opinion issued in corresponding International Application No. PCT/KR2008/006457 dated May 28, 2009.

(Continued)

*Primary Examiner* — Prabodh M Dharia

(74) *Attorney, Agent, or Firm* — Staas & Halsey LLP

(57) ABSTRACT

A method of controlling a display area of a touch screen device includes detecting a touch on the display area of the touch screen device; determining whether the detected touch is being used to hold the touch screen device or to activate a function of the touch screen device; and selectively changing the display area of the touch screen device based on a result of the determination.

20 Claims, 6 Drawing Sheets

(56) References Cited

U.S. PATENT DOCUMENTS

| | | | | |
|---|---|---|---|---|
| 2005/0110772 | A1* | 5/2005 | Kong et al. | 345/174 |
| 2006/0161871 | A1* | 7/2006 | Hotelling et al. | 715/863 |
| 2007/0035527 | A1* | 2/2007 | Cheon et al. | 345/173 |
| 2007/0188471 | A1* | 8/2007 | Mak-Fan et al. | 345/167 |
| 2008/0016468 | A1* | 1/2008 | Chambers et al. | 715/835 |
| 2008/0070684 | A1* | 3/2008 | Haigh-Hutchinson | 463/32 |
| 2008/0119237 | A1* | 5/2008 | Kim | 455/566 |
| 2008/0168290 | A1* | 7/2008 | Jobs et al. | 713/324 |
| 2008/0225007 | A1* | 9/2008 | Nakadaira et al. | 345/173 |
| 2008/0291225 | A1* | 11/2008 | Arneson | 345/698 |
| 2008/0300055 | A1* | 12/2008 | Lutnick et al. | 463/39 |
| 2008/0316181 | A1* | 12/2008 | Nurmi | 345/173 |
| 2009/0019188 | A1* | 1/2009 | Mattice et al. | 710/17 |
| 2009/0064055 | A1* | 3/2009 | Chaudhri et al. | 715/863 |
| 2009/0098925 | A1* | 4/2009 | Gagner et al. | 463/20 |
| 2009/0195959 | A1* | 8/2009 | Ladouceur et al. | 361/283.1 |
| 2009/0215497 | A1* | 8/2009 | Louch | 455/566 |
| 2009/0224999 | A1* | 9/2009 | Kuwahara et al. | 345/1.3 |
| 2009/0225041 | A1* | 9/2009 | Kida et al. | 345/173 |
| 2009/0259969 | A1* | 10/2009 | Pallakoff | 715/808 |
| 2009/0280910 | A1* | 11/2009 | Gagner et al. | 463/42 |
| 2009/0303187 | A1* | 12/2009 | Pallakoff | 345/169 |
| 2010/0103098 | A1* | 4/2010 | Gear et al. | 345/158 |
| 2010/0212087 | A1* | 8/2010 | Leib et al. | 5/81.1 R |

FOREIGN PATENT DOCUMENTS

| | | |
|---|---|---|
| KR | 2003-13720 | 2/2003 |
| KR | 10-2007-0001440 | 1/2007 |
| KR | 2007-10415 | 1/2007 |
| WO | WO 2004/051392 | 6/2004 |

OTHER PUBLICATIONS

Korean Office Action issued Dec. 26, 2013 in Korean Patent Application No. 10-2008-0005334.

"Present and Future of HCI Technology", Naver Blog, Feb. 9, 2007, 1 page.

* cited by examiner

METHOD AND APPARATUS FOR CONTROLLING DISPLAY AREA OF TOUCH SCREEN DEVICE

CROSS-REFERENCE TO RELATED APPLICATIONS

This application claims the benefit of Korean Patent Application No. 2008-5334 filed on Jan. 17, 2008, in the Korean Intellectual Property Office, the disclosure of which is incorporated herein by reference in its entirety.

BACKGROUND OF THE INVENTION

1. Field of the Invention

Aspects of the invention relate to a touch screen device, and more particularly, to a method and an apparatus for controlling a display area of a touch screen device to increase user convenience in a mobile device including a touch screen, and a computer-readable medium storing the method.

2. Description of the Related Art

Digital convergence has led to an increasing number of functions being provided in digital devices, resulting in an increase in the physical space requirements of the digital devices. Therefore, in order to obtain a maximum space and realize an attractive design in digital devices, developers typically design the digital devices to have a display area, such as an LCD, on the entire front surface of the digital devices. Further, developers typically replace input devices (such as buttons, switches, and wheels) located on the front or side surface of conventional devices with other input devices, such as a touch screen, in the digital devices.

FIGS. 1A and 1B show display screens of a typical touch screen device when video is being reproduced and a menu is being manipulated by a user. Referring to FIG. 1A, if the user does not touch a touch screen, a display device displays content such as video or a still image on a full screen (110). If the user touches the touch screen to select a menu, a menu bar is displayed on part of the touch screen, and the content is displayed on the other part of the touch screen (120).

Alternatively, referring to FIG. 1B, before the user touches the touch screen, menu icons are displayed on the touch screen overlying the content so that the user can select a desired menu (130). The user touches one of the displayed menu icons in order to select a desired menu (140).

FIGS. 2A and 2B show display screens for explaining problems of a typical touch screen device. Referring to FIG. 2A, the user holds the touch screen device displaying content using a finger 220 (210). However, the touch screen device may erroneously interpret the touch of the finger 220 for holding as a touch for selecting a menu. Even if a menu is not inadvertently selected by the touch of the finger 220 for holding, the finger 220 still covers part of the touch screen, preventing the user from viewing the entire content. When the user attempts to select a from menu bar displayed in response to the touch of the finger 220, the finger 220 covers part of the menu bar, preventing the user from easily selecting a desired menu (230).

Referring to FIG. 2B, if the user holds the touch screen device displaying menu icons using a finger 260 (250), a problem similar to that described with regard to FIG. 2A may occur. That is, the user may have to touch part of the touch screen displaying the menu icons using the finger 260 in order to stably hold the touch screen device. However, the finger 260 covers part of the touch screen, preventing the user from manipulating some or all of the menu icons.

Further, it would be desirable if a touch screen device could enhance user convenience by adapting to characteristics of individual users, such as a size of a finger and a type of touch, such as light, medium, or heavy.

SUMMARY OF THE INVENTION

Aspects of the invention relate to a method and an apparatus for controlling a display area of a touch screen device to increase user convenience when a user uses the touch screen device, and a computer-readable medium encoded with processing instructions for implementing the method.

Aspects of the invention also relate to a method and an apparatus for controlling a display area of a touch screen device to enable a user to more easily hold the touch screen device without worrying how he or she is holding the touch screen device, and a computer-readable medium encoded with processing instructions for implementing the method.

According to an aspect of the invention, a method of controlling a display area of a touch screen device includes detecting a touch on the display area of the touch screen device; determining whether the detected touch is being used to hold the touch screen device or to activate a function of the touch screen device; and selectively changing the display area of the touch screen device based on a result of the determination.

According to an aspect of the invention, the selective changing of the display area includes maintaining an original display area of the touch screen device if the detected touch is being used to realize a function of the touch screen device.

According to an aspect of the invention, the determining of whether the detected touch is being used to hold the touch screen device or to activate a function of the touch screen device is based on a touch time of the detected touch and/or a size of a touch area where the detected touch is detected.

According to an aspect of the invention, the selective changing of the display area of the touch screen device includes determining at least one rectangular area that can be formed from at least one visible display area of the display area of the touch screen device if the detected touch is being used to hold the touch screen device; selecting at least one active area from the at least one determined rectangular area based on a size of each of the at least one determined rectangular area; and setting each of the at least one selected active area as a new display area.

According to an aspect of the invention, the method further includes detecting a 3D (three-dimensional) orientation of the touch screen device; and selectively changing a display direction of the display area based on the detected 3D orientation.

According to an aspect of the invention, the detecting, the determining, and the selectively changing are repeatedly performed to selectively change the display area based on changes in the detected touch.

According to an aspect of the invention, an apparatus for controlling a display area of a touch screen device includes a touch detecting unit to detect a touch on the display area of the touch screen device; a hold determining unit to determined whether the detected touch is being used to hold the touch screen device or to activate a function of the touch screen device; and a display area changing unit to selectively change the display area of the touch screen device based on a result of the determination made by the hold determining unit.

According to aspect of the invention, a computer-readable medium is encoded with processing instructions for implementing a method of controlling a display area of a touch screen device, the method including detecting a touch on the display area of the touch screen device; determining whether the detected touch is being used to hold the touch screen device or to activate a function of the touch screen device; and selectively changing the display area of the touch screen device based on a result of the determination.

According to an aspect of the invention, a method of controlling a display area of a touch screen device includes detecting a touch on the display area of the touch screen device; determining whether the detected touch is being used to hold the touch screen device or to activate a function of the touch screen device; and controlling the display area of the touch screen device based on a result of the determination.

Additional aspects and/or advantages of the invention will be set forth in part in the description that follows and, in part, will be obvious from the description, or may be learned by practice of the invention.

BRIEF DESCRIPTION OF THE DRAWINGS

A better understanding of the invention will become apparent from the following detailed description of example embodiments of the invention and the claims when read in connection with the accompanying drawings, all forming a part of the disclosure of the invention. While the following written and illustrated disclosure focuses on disclosing example embodiments of the invention, it should be clearly understood that the same is by way of illustration and example only, and that the invention is not limited thereto. The spirit and scope of the invention are limited only by the terms of the claims and their equivalents. The following represents brief descriptions of the drawings, wherein:

DETAILED DESCRIPTION OF THE EMBODIMENTS

Figure 1A:
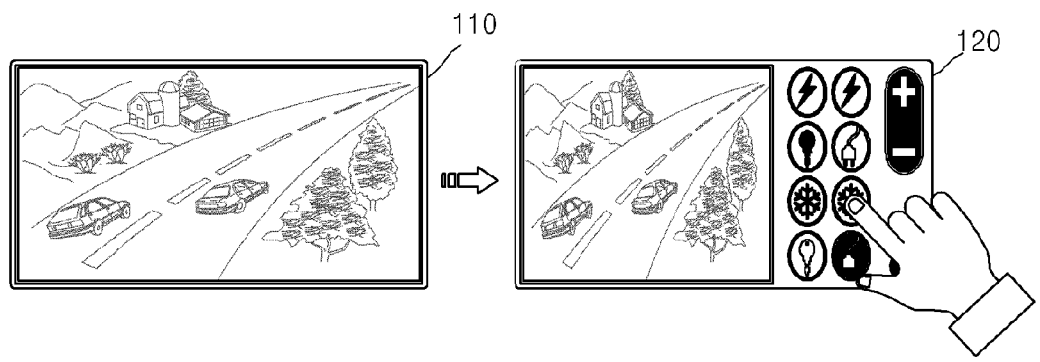
FIGS. 1A and 1B show display screens of a typical touch screen device when video is being reproduced and a menu is being manipulated by a user.
Figure 1B:
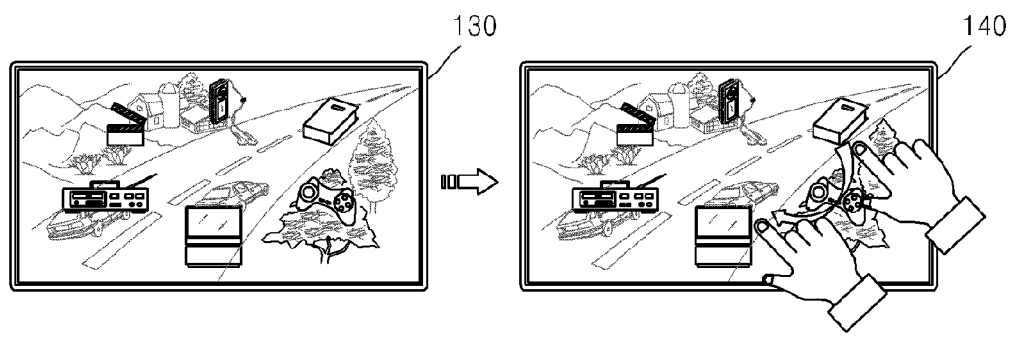

Reference will now be made in detail to embodiments of the invention, examples of which are shown in the accompanying drawings, wherein like reference numerals refer to like elements throughout. The embodiments are described below in order to explain the invention by referring to the figures.

Figure 3:
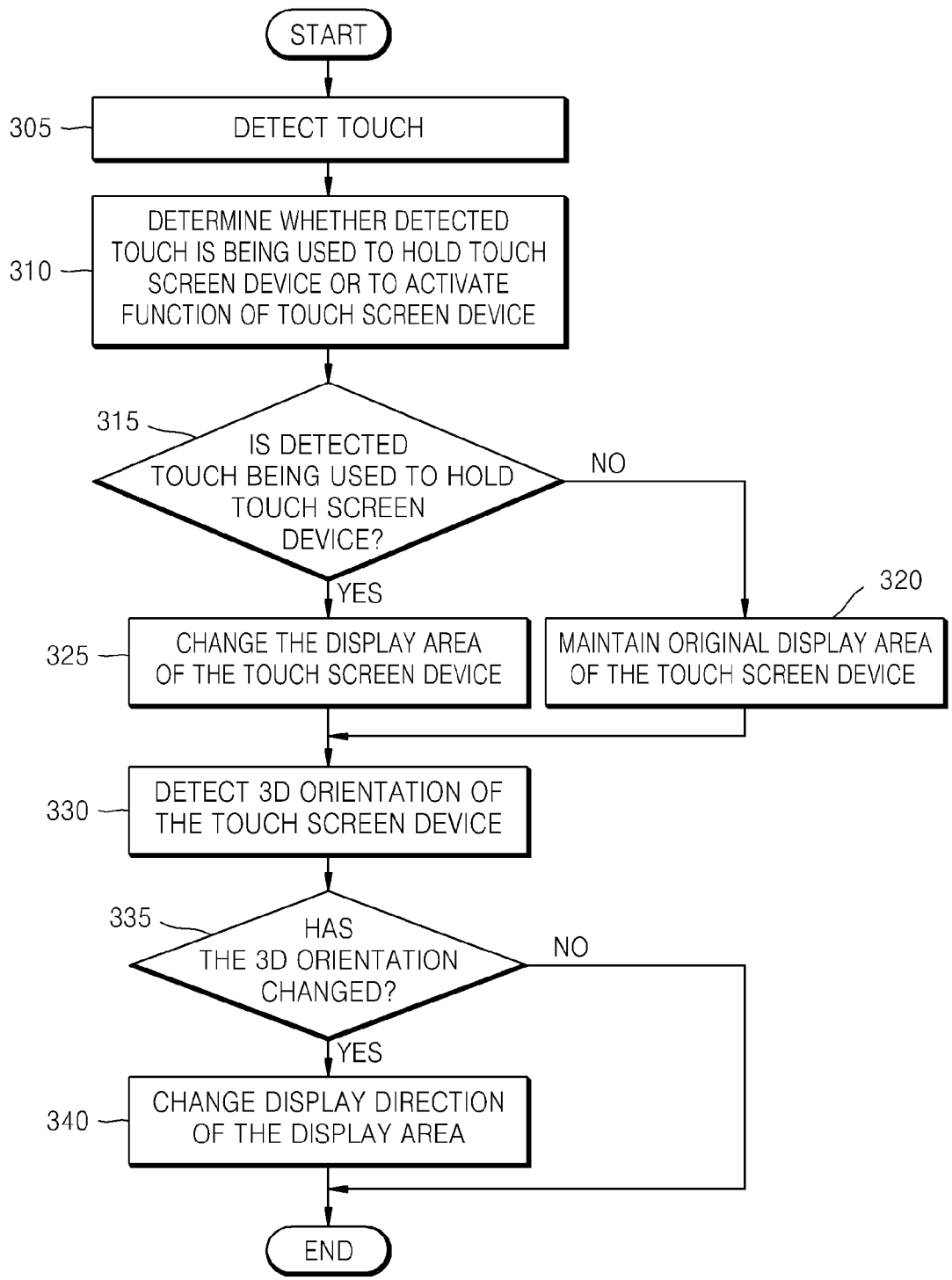
FIG. 3 is a flowchart of a method of controlling a display area of a touch screen device according to an aspect of the invention.

FIG. 3 is a flowchart of a method of controlling a display area of a touch screen device according to an aspect of the invention. Referring to FIG. 3, in operation 305, a display area control device detects a user touch on a display area of the touch screen device. The user touch is detected by detecting a finger touch on the display area and calculating coordinates of a touch area of the display area where the finger touch is detected. However, it is understood that other methods of detecting the user touch may be used.

In operation 310, the display area control device determines whether the user touch detected in operation 305 is being used to hold the touch screen device or to activate a function of the touch screen device. A user touch for activating a function of the touch screen device is an intentional touch of the display area representing a user input of a specific instruction used to execute a specific operation of the touch screen device, like reproducing content or selecting a menu. In contrast, a user touch for holding the touch screen device is an incidental touch of the display area of the touch screen device in order to carry or support the touch screen device without an intention of activating a function of the touch screen device.

The user touches a relatively small area of the touch screen for a relatively short time in order to activate a function of the touch screen device, whereas the user touches a relatively large area of the touch screen for a relatively long time in order to hold the touch screen device.

Therefore, the display area control device can determine whether the user touch is being used to hold the touch screen device or to activate a function of the touch screen device based on a size of a touch area calculated from coordinates of the touch area and/or a touch period of time. However, it is understood that such a determination is not limited to being made based on the size of the touch area and/or the touch period of time, but may be made based on any touch characteristic that differs between when a user holds a touch screen device and when the user activates a function of the touch screen device.

Further, the size of the touch area and/or the touch period of time used to determine whether the user touch is being used to hold the touch screen device need not have a fixed value, but various values can be used based on a user environment, or a user's experience in using the touch screen device, or experimental values obtained by testing the touch screen device.

For example, when the user touches the touch screen device, if a touch area is less than 1 $cm^2$, the touch screen device determines that the user touch is being used to activate a function of the touch screen device. If the touch area is greater than 1 $cm^2$, the touch screen device measures a touch period of time. If the touch period of time is greater than 1 second, the touch screen device determines that the user touch is being used to hold the touch screen device. If the touch period of time is less than 1 second, the touch screen device determines that the user touch is being used to activate a function of the touch screen device. In this example, a touch area less than 1 $cm^2$ would be a relatively small area, while a touch area greater than 1 $cm^2$ would be a relatively large area, and a touch period of time of less than 1 second would be a relatively short time, while a touch period of time greater than 1 second would be a relatively long time. A touch area of exactly 1 $cm^2$ may be included in either the relatively small area or the relatively large area, and a touch period of time of exactly 1 second may be included in either the relatively short time or the relatively long time. However is understood that thresholds other than 1 $cm^2$ and 1 second may be used, and that various other criteria and/or methods be used in order to determine whether the user touch is being used to hold the touch screen device.

In operation 315, if the detected touch is being used to activate a function of the touch screen device, operation 320 is performed. Conversely, if the detected touch is being used to hold the touch screen device, operation 325 is performed.

In operation 320, which is performed if the detected touch is being used to activate a function of the touch screen device, the display area control device maintains an original display area of the touch screen device and controls the touch screen device to perform the function activated by the user, like reproducing video or selecting a menu.

In operation 325, which is performed if the detected touch is being used to hold the touch screen device, the display area control device changes the display area of the touch screen device. The changing of the display area is performed to prevent content from being displayed in an invisible display area of the touch screen device that is invisible to the user because it is blocked by the user's finger that is being used to hold the touch screen device. The display area control device controls the touch screen device not to display content in the invisible display area, but to display content only in a visible display area of the touch screen device.

Figure 2A:
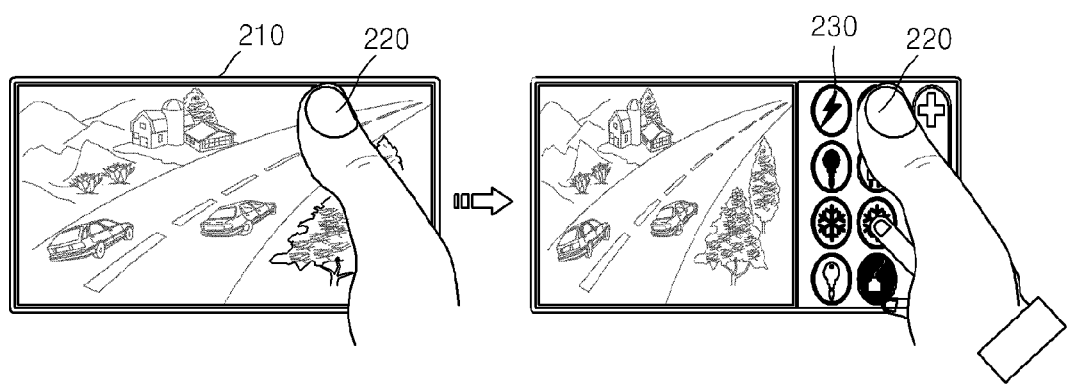
FIGS. 2A and 2B show display screens for explaining problems of a typical touch screen device.
Figure 2B:
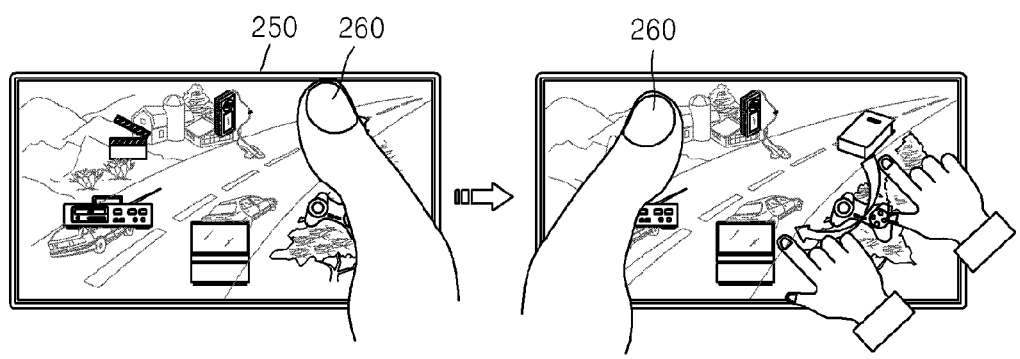
Figure 4:
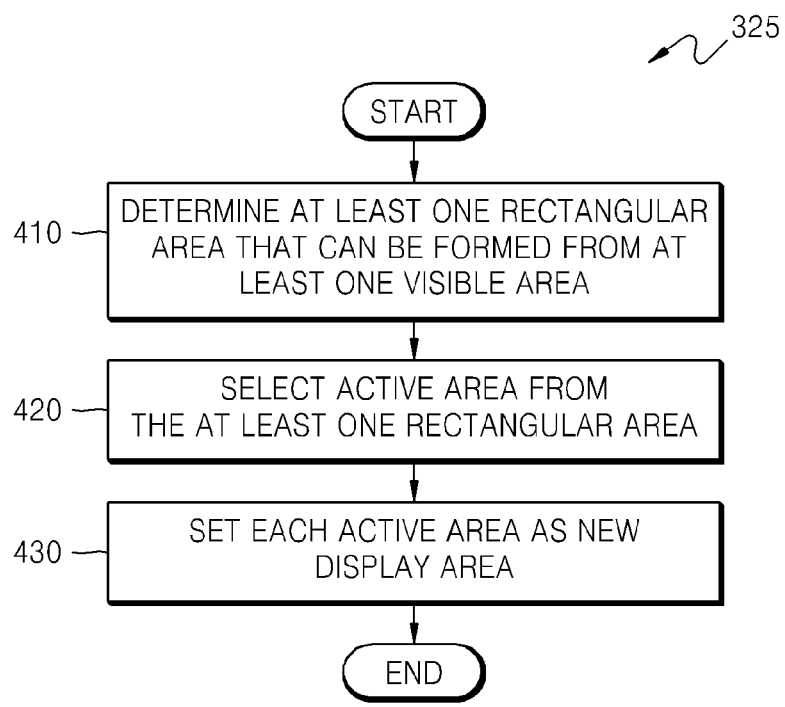
FIG. 4 is a flowchart of a method of changing a display area of a touch screen device according to an aspect of the invention.

FIG. 4 is a flowchart of a method of changing a display area of a touch screen device according to an aspect of the invention corresponding to operation 325 in FIG. 3. Referring to FIG. 4, in operation 410, a display area control device determines at least one rectangular area that can be formed from at least one visible display area. A visible display area is a portion of an entire display area that excludes an area where the user is holding the touch screen device. For example, referring to the left example in FIG. 2A, the areas to the left and the right of the finger 220 are left and right visible display areas, respectively. The display area control device may form a left rectangular area having a maximum possible size from the left visible display area, and may form a right rectangular area having a maximum possible size from the right visible display area, thereby forming one rectangular area from each of the left and right visible display areas. However, it is understood that two or more rectangular areas each having less than a maximum possible size may be formed from each of the left and right visible display areas. It is also understood that a rectangular area may include a square area, and that a non-rectangular area having any desired shape may be formed from a visible display area.

In operation 420, the display area control device selects at least one active area from the at least one determined rectangular area based on the size of the rectangular area. An active area is an area used by a touch screen device to display content. According to an aspect of the invention, content is displayed only in an active area, and is not displayed in any inactive area.

For example, the touch screen device may select one active area when reproducing video, and may select two active areas when displaying a menu bar and reproducing video. When the touch screen device selects two active areas, it may display the video in one active area and display the menu bar in another active area.

In operation 430, the display area control device sets each of the at least one selected active area as a new display area, and displays content in each new display area.

However, it is understood that a method of changing the display area of the touch screen device is not limited the method described above, but the invention can use various other methods according to other aspects of the invention.

Referring again to FIG. 3, in operation 330, the display area control device detects a 3D (three-dimensional) orientation of the touch screen device. A gyroscope may be used to detect the 3D orientation. For example, the gyroscope may be used to determine whether a user is holding the touch screen device horizontally or vertically. The gyroscope may be a vibrating structure gyroscope or any other suitable type of gyroscope.

In operation 335, if the 3D orientation has changed from a previous 3D orientation, operation 340 is performed. If the 3D orientation has not changed from a previous 3D orientation, operation 340 is not performed, and the process ends. A variety of criteria may be used to determine whether the 3D orientation has changed from the previous 3D orientation according to aspects of the invention. For example, the display area control device may determine whether the user is holding the touch screen device horizontally or vertically, and whether a direction in which the user is holding the touch screen device has changed.

In operation 340, the display area control device selectively changes a display direction of the display area based on the detected 3D orientation. For example, if the user changes a direction in which he or she is holding the touch screen device from horizontal to vertical, the display area control device may change the display direction of the display area from horizontal to vertical.

In order to enable the display area control device to detect changes in the touch area touched by the user, operations 310 through 325 (or 340) may be repeatedly performed.

Figure 5:
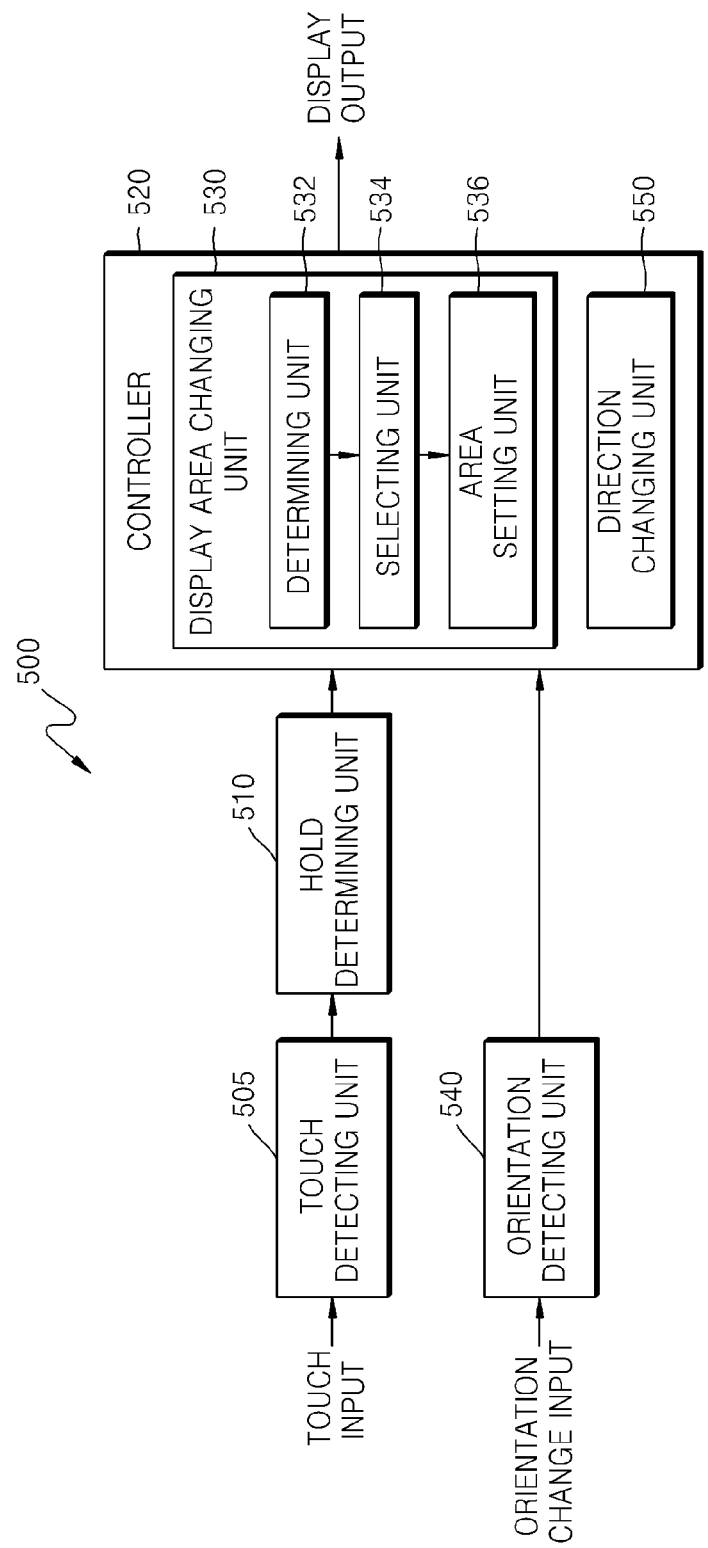
FIG. 5 is a block diagram of a display area control device of a touch screen device according to an aspect of the invention.

FIG. 5 is a block diagram of a display area control device 500 of a touch screen device according to an aspect of the invention. Referring to FIG. 5, the display area control device 500 includes a touch detecting unit 505, a hold determining unit 510, and a controller 520, and may further include an orientation detecting unit 540.

The touch detecting unit 505 detects a user touch on a display area of a touch screen device.

The hold determining unit 510 determines whether the user touch detected by the touch detecting unit 505 is being used to hold the touch screen device or to activate a function of the touch screen device. The hold determining unit 510 may, for example, determine whether the detected touch is being used to hold the touch screen device based on a touch time or a size of a touch area where the user touch is detected.

The orientation detecting unit 540 detects a 3D orientation of the touch screen device.

The controller 520 controls a display of the touch screen device, and includes a display area changing unit 530 and a direction changing unit 550.

The display area changing unit 530 receives data including information on whether the user touch is being used to hold the touch screen device or is being used to activate a function of the touch screen device from the hold determining unit 510. The display area changing unit 530 selectively changes a display area of the touch screen device based on the data received from the hold determining unit 510. Specifically, if the data received from the hold determining unit 510 indicates that the detected touch is being used to hold the touch screen device, the display area changing unit 530 changes a display area of the touch screen device. Conversely, if the data received from the hold determining unit 510 indicates that the detected touch is being used to activate a function of the touch screen device, the display area changing unit 530 maintains the original display area of the touch screen device.

For example, the display area changing unit 530 may include a determining unit 532, a selecting unit 534, and an area setting unit 536. The determining unit 532 determines at least one rectangular area that can be formed from a visible display area. The selecting unit 534 selects at least one active area from the at least one determined rectangular area based on a size of the at least one determined rectangular area. The area setting unit 536 sets each of the at least one selected active area as a new display area.

The direction changing unit 550 receives data including information on the 3D orientation of the touch screen device from the orientation detecting unit 540. The direction changing unit 550 selectively changes a display direction of the display area based on the data received from the orientation detecting unit 540.

If the touch detecting unit 505 detects a change in the touch area, the display area control device 500 may change the display area of the touch screen device again.

Figure 6A:
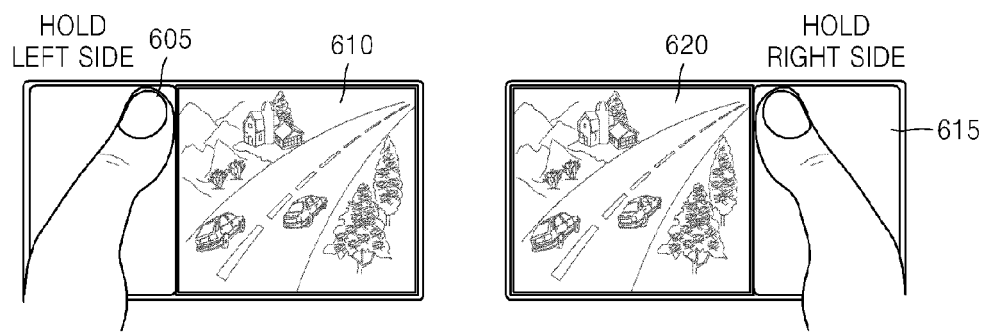
FIG. 6A shows display screens when video is being reproduced in a touch screen device according to an aspect of the invention.

FIG. 6A shows display screens when video is being reproduced in a touch screen device according to an aspect of the invention. Referring to FIG. 6A, video is not displayed in rectangular areas 605 and 615 of the display screen where a user is holding the touch screen device, but is displayed only in rectangular areas 610 and 620 selected from a visible area of the display screen.

Figure 6B:
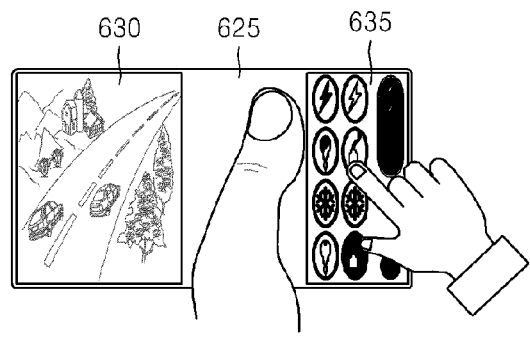
FIG. 6B shows a display screen when video is being reproduced and a menu is being manipulated by a user in a touch screen device according to an aspect of the invention.

FIG. 6B shows a display screen when video is being reproduced and a menu is being manipulated by a user in a touch screen device according to an aspect of the invention. Referring to FIG. 6B, the video and the menu bar are not displayed in a center rectangular area 625 of the display screen where a user is holding the touch screen device, while the video is displayed only in a left rectangular area 630 selected from a visible area of the display screen, and the menu bar is displayed only in a right rectangular area 635 selected from a visible area of the display screen.

Figure 6C:
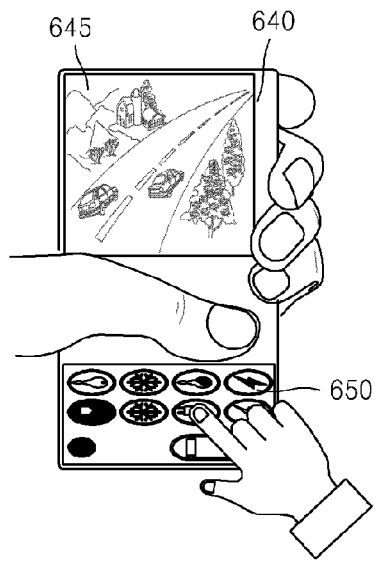
FIG. 6C shows a display screen when video is being reproduced and a menu is being manipulated by a user in a touch screen device according to an aspect of the invention.

FIG. 6C shows a display screen when video is being reproduced and a menu is being manipulated by a user in a touch screen device according to an aspect of the invention. Referring to FIG. 6C, the video and the menu bar are not displayed in an area 640 of the display screen including a plurality of rectangular areas where the user is holding the touch screen device, while the video is displayed only in a top left rectangular 640 selected from a visible area of the display screen, and the menu bar is displayed only in a bottom rectangular area 650 selected from a visible area of the display screen. Since the user is holding the touch screen device vertically, the video is displayed vertically in the top left rectangular area 645.

A method of controlling the display area of the touch screen device according to an aspect of the invention can be embodied as a computer-readable program encoded with processing instruction for implementing the method, and may be implemented using a general-purpose computer, a special-purpose digital computer, an application-specific integrated circuit, or any suitable combination of hardware and/or software. The computer-readable medium may be a magnetic recording medium (a ROM, a floppy disk, a hard disk, etc.), an optical recording medium (a CD-ROM, a DVD, a Blu-ray disc, etc.), or any other computer-readable medium that can store data that can thereafter be read by a computer. The processing instructions for implementing the method may be embodied in a computer data signal modulated on a carrier wave or transmitted over a network, such as the Internet. The computer-readable recording medium may also be distributed over network-coupled computer systems so that the processing instructions are stored and executed in a distributed fashion.

According to an aspect of the invention, if a user holds a touch screen device so that the user's finger blocks a portion of the display area of the touch screen device, the display area of the touch screen device is changed so that reproduced content, such a video or a still image and/or a menu bar are not displayed in the blocked portion of the display area, thereby increasing user convenience when the user uses the touch screen device.

While there have been shown and described what are considered to be example embodiments of the invention, it will be understood by those skilled in the art and as technology develops that changes and modifications may be made in these example embodiments, and equivalents may be substituted for elements thereof, without departing from the true scope of the invention. Many modifications, permutations, additions and sub-combinations may be made to adapt the teachings of the invention to particular situations without departing from the scope thereof. Accordingly, it is intended, therefore, that the invention not be limited to the various example embodiments disclosed herein, but include all embodiments falling within the scope of the claims and their equivalents.

What is claimed is:

1. A method of controlling a display area of a touch screen device, the method comprising:
    detecting a touch on the display area of the touch screen device;
    determining whether the detected touch is an incidental touch which is being used to grasp the touch screen device or an intentional touch to activate a function of the touch screen device; and
    selectively changing at least one of a size and a position of an active area of the display area of the touch screen device based on the determined incidental touch,
    wherein the active area is a portion of the display area of the touch screen where content or a menu is displayed.

2. The method of claim 1, wherein the selective changing of the at least one of a size and a position of the active area of the touch screen device comprises maintaining an original display area of the touch screen device if the detected touch is being used to realize a function of the touch screen device.

3. The method of claim 1, wherein the determining of whether the detected touch is being used to grasp the touch screen device or to activate a function of the touch screen device is based on a touch time of the detected touch and/or a size of a touch area where the detected touch is detected.

4. The method of claim 1, wherein the selective changing of the at least one of a size and a position of the active area of the touch screen device comprises:
    determining at least one rectangular area that can be formed from at least one visible display area of the display area of the touch screen device if the detected touch is being used to grasp the touch screen device;
    selecting at least one active area from the at least one determined rectangular area based on a size of each of the at least one determined rectangular area; and
    setting each of the at least one selected active area as a new display area.

5. The method of claim 1, further comprising:
    detecting a 3D orientation of the touch screen device; and
    selectively changing a display direction of the display area based on the detected 3D orientation.

6. The method of claim 1, wherein the detecting, the determining, and the selectively changing are repeatedly performed to selectively change the at least one of a size and a position of the active area based on changes in the detected touch.

7. An apparatus for controlling a display area of a touch screen device, the apparatus comprising:
    a touch detecting unit to detect a touch on the display area of the touch screen device;
    a hold determining unit to determine whether the detected touch is an incidental touch which is being used to grasp the touch screen device or an intentional touch to activate a function of the touch screen device; and
    a display area changing unit to selectively change at least one of a size and a position of an active area of the display area of the touch screen device based on the determined incidental touch, wherein the active area is a portion of the display area of the touch screen where content or a menu is displayed.

8. The apparatus of claim 7, wherein the display area changing units maintains an original display area of the touch screen device if the hold determining unit determines that the detected touch is being used to realize a function of the touch screen device.

9. The apparatus of claim 7, wherein the hold determining unit determines whether the detected touch is being used to grasp the touch screen device or to activate a function of the touch screen device based on a touch time of the detected touch and/or a size of a touch area where the detected touch is detected.

10. The apparatus of claim 7, wherein the display area changing unit comprises:
a determining unit to determine at least one rectangular area that can be formed from at least one visible display area of the display area of the touch screen device if the hold determining unit determines that the detected touch is being used to grasp the touch screen device;
a selecting unit to select at least one active area from the at least one determined rectangular area based on a size of each of the at least one determined rectangular area; and
an area setting unit to set each of the at least one selected active area as a new display area.

11. The apparatus of claim 7, further comprising:
an orientation detecting unit to detect a 3D orientation of the touch screen device; and
a direction changing unit to selectively change a display direction of the display area based on the detected 3D orientation.

12. The apparatus of claim 7, wherein if the touch detecting unit detects a change in the detected touch, the hold determining unit determines whether the changed detected touch is being used to grasp the touch screen device or to activate a function of the touch screen device, and the display area changing unit selectively changes the at least one of a size and a position of the active area of the touch screen device again if necessary based on a result of the determination made by the hold determining unit with respect to the changed detected touch.

13. A computer-readable medium encoded with processing instructions for implementing a method of controlling a display area of a touch screen device performed by a computer, the method comprising:
detecting a touch on the display area of the touch screen device;
determining whether the detected touch is an incidental touch which is being used to grasp the touch screen device or an intentional touch to activate a function of the touch screen device; and
selectively changing at least one of a size and a position of an active area of the display area of the touch screen device based on the determined incidental touch,
wherein the active area is a portion of the display area of the touch screen where content or a menu is displayed.

14. A method of controlling a display area of a touch screen device, the method comprising:
detecting a touch on the display area of the touch screen device;
determining whether the detected touch is an incidental touch which is being used to grasp the touch screen device or an intentional touch to activate a function of the touch screen device; and
controlling at least one of a size and a position of an active area of the display area of the touch screen device based on the determined incidental touch,
wherein the active area is a portion of the display area of the touch screen where content or a menu is displayed.

15. The method of claim 14, wherein the determining of whether the detected touch is being used to grasp the touch screen device or to activate a function of the touch screen device is based on a size of a touch area where the detected touch is detected and a touch time of the detected touch.

16. The method of claim 15, wherein the determining of whether the detected touch is being used to grasp the touch screen device or to activate a function of the touch screen device comprises:
determining that the detected touch is being used to grasp the touch screen device if the touch area exceeds a predetermined touch area size and the touch time exceeds a predetermined touch time; and
determining that the detected touch is being used to activate a function of the touch screen device if the touch area does not exceed the predetermined touch area size, or if the touch area exceeds the predetermined touch area size but the touch time does not exceed the predetermined touch time.

17. The method of claim 16, wherein the predetermined touch time is 1 second, and the predetermined touch area size is 1 $cm^2$.

18. The method of claim 14, wherein the controlling of the display area of the touch screen device comprises:
controlling the display area of the touch screen device so that nothing is displayed in a touch area where the detected touch is detected when the detected touch is being used to grasp the touch screen device; and
controlling the display area of the touch screen to maintain an original display area of the touch screen device when the detected touch is being used to activate a function of the touch screen device.

19. The method of claim 18, wherein the controlling of the display area so that nothing is displayed in a touch area where the detected touch is detected when the detected touch is being used to grasp the touch screen device comprises:
determining at least one rectangular area that can be formed from at least one visible display area of the display area of the touch screen device, each of the at least one visible display area excluding the touch area;
selecting at least one active area from the at least one determined rectangular area based on a size of each of the at least one determined rectangular area; and
setting each of the at least one selected active area as a new display area.

20. The method of claim 19, wherein the determining of at least one rectangular area that can be formed from at least one visible display area of the display area of the touch screen device comprises determining one rectangular area having a maximum size that can be formed from each of the at least one visible display area.

* * * * *